May 16, 1939.                A. R. LINTERN                2,158,332
VEHICLE VENTILATING APPARATUS
Filed Oct. 1, 1936
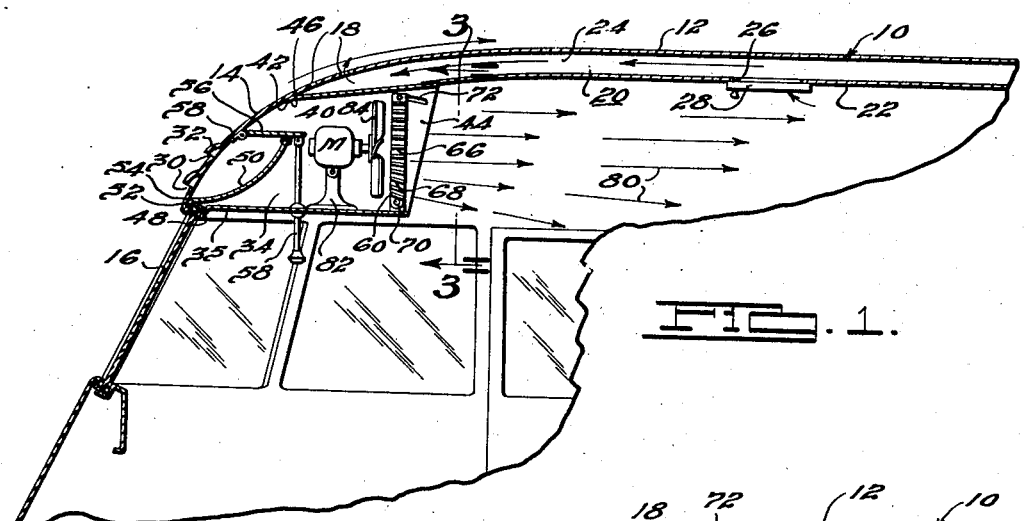
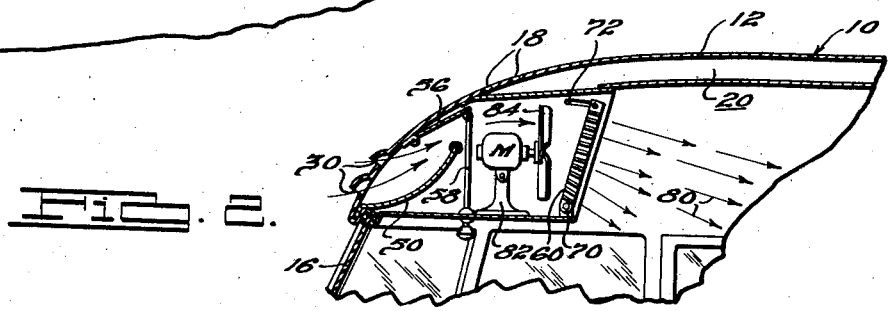
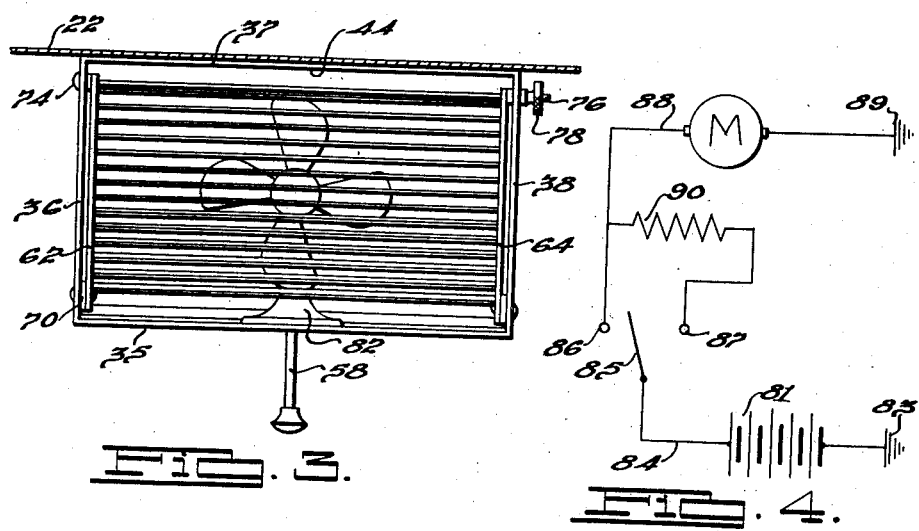
INVENTOR
Alfred R. Lintern.
BY
Harness, Dickey, Pierce & Hann.
ATTORNEYS.

Patented May 16, 1939

2,158,332

UNITED STATES PATENT OFFICE 2,158,332

VEHICLE VENTILATING APPARATUS

Alfred R. Lintern, Detroit, Mich., assignor to Evans Products Company, Detroit, Mich., a corporation of Delaware Application October 1, 1936, Serial No. 103,520

1 Claim. (Cl. 98—2)

This invention relates to improvements in ventilating apparatus and in particular relates to ventilating vehicles in which air is injected into and ejected from the interior of the vehicle body.

Objects of the invention are to provide a relatively simple ventilating structure for operation under varied weather conditions; to provide a ventilating structure adapted to be conveniently applied to conventional vehicles with a minimum of alteration; to provide a structure in which air is injected into and ejected from the vehicle and in which the injected air may be selectively directed to the desired points within the vehicle; to provide, in vehicles having injector openings, a rigid structure over the openings within the vehicle, the construction and arrangement being such that an adequate supply of air is provided both when the vehicle is at rest and when moving at various rates of speed; and to provide a structure which is rugged in character and inexpensive to manufacture.

Other objects of the invention will become apparent from the following specification, the drawing relating thereto, and from the claim hereinafter set forth.

In the drawing in which like numerals are used to designate like parts in the several views throughout:

Figure 1 is a fragmentary vertical cross sectional view of a vehicle embodying features of the present invention;

Figure 2 is a fragmentary vertical cross sectional view similar to that shown in Figure 1 but with certain of the parts in different operating positions;

Figure 3 is an end elevational view taken substantially along the line 3—3 of Figure 1; and Figure 4 shows a wiring diagram embodying features of the present invention.

The present invention relates to improvements over the structure shown in United States Letters Patent No. 1,969,934 granted to William Lintern and Alfred R. Lintern. In the patent referred to, a structure is disclosed in which air is injected into the body of a vehicle and ejected from the body for the purpose of maintaining the interior of the body in a properly ventilated condition.

In ventilating vehicles, and in particular in ventilating buses carrying a great number of passengers and which, in operation, make frequent stops, it is necessary to provide a constant supply of fresh air to the interior of the vehicle and withdraw the vitiated air from the interior of the vehicle in order to obtain proper ventilation. The structure to provide such ventilation must be such that it is adapted to operate under varied weather conditions since the fresh air supplied to the interior body is drawn in from the outside and may vary considerably as to temperature. It is evident then that it is desirable to have an apparatus which may be operated satisfactorily in both summer and winter.

The present invention contemplates ventilating the interior of a vehicle body by providing ejector openings in the roof of the vehicle body closely adjacent to the front wall thereof in the low pressure area and providing means communicating these ejector openings with the interior of the vehicle for the purpose of withdrawing and discharging the vitiated air from the interior of the vehicle body. Injector openings are also provided in the roof, or in the upper portion of the forwardly facing front wall of the vehicle above the windshield but below the ejector openings, so that fresh air may be provided in the interior or passenger compartment of the vehicle. The number and arrangement of these injector openings may be varied as desired. That is, the openings may be arranged at the sides of the vehicle or at the transverse center only, depending upon the ventilating effect desired.

A header forming an air inlet conduit is provided within the interior of the vehicle over the injector openings and is provided with means which will prevent the entrance of foreign material, such as snow or rain, into the interior of the vehicle, and with means by which the volume and direction of air passing through the conduit into the interior of the vehicle may be selectively controlled. This latter means includes a fan which may be operated at various speeds to get the ventilating effect desired in a manner to be described hereinafter in greater detail.

In the drawings, in which the preferred embodiment of the invention is illustrated, the forward portion of a vehicle 10 is shown having a roof 12 curved gradually downwardly at its forward edge 14 to form and merge with the upper portion of the forwardly facing front wall within which is mounted a conventional windshield 16. In order to properly ventilate the interior of the vehicle body which forms the passenger compartment, ejector openings 18, preferably in the form of slots located substantially at the transverse center of the vehicle, are provided in the roof structure adjacent the upper portion of the forwardly facing wall in the low pressure area created by forward movement of the vehicle, and the openings 18 communicate with the interior of the vehicle body through an exhaust conduit 20 formed by means of side walls 24 in the space between the head lining 22 and the roof 12 longitudinally of the vehicle, confining the passage of air therethrough. The conduit 20 communicates with the interior of the vehicle through openings 26 provided in the head lining 22 over which suitable adjustable dampers 28 are mounted for regulating and controlling the volume of air exhausted from the passenger compartment, and, although only one opening is shown, it is to be understood that any desired number of openings 26 longitudinally of the vehicle communicating with the passenger compartment may be provided.

For supplying fresh air to the interior of the vehicle, injector openings 30 are provided preferably immediately above the windshield in that part of the roof forming the upper portion of the forwardly facing front wall. Louvres 32 are preferably provided over the openings 30 so as to trap the upwardly sweeping air and insure an adequate supply into the interior of the vehicle body. In order to control the amount of fresh air supplied the passenger compartment of the vehicle, a substantially rectangular header 34 is mounted within the vehicle body for communicating the injector openings 30 with the passenger compartment of the vehicle.

In the preferred embodiment illustrated the injector openings 30 and the header 34 are located immediately below the ejector openings 18 at substantially the transverse center of the vehicle; but it is to be understood, as pointed out above, that the injector openings 30 may be provided either at one or both of the transverse sides of the vehicle according to the ventilating effects desired.

The header 34 is preferably substantially rectangular in transverse section and includes walls 35, 36, 37 and 38 which form an inlet conduit 40 having openings 42 and 44 at its inlet and discharge ends respectively. In order to secure the header 34 in place within the vehicle the upper wall 37 is suitably secured to the head lining 22 at its discharge end 44 and is provided with a downwardly directed flange 46 at its inlet end 42 which is shaped to conform to the contour of the inner face of the portion 14 of the roof and is suitably secured to the portion 14 along the flange 46. The lower wall 35 is provided with a transversely and downwardly extending flange 48 which is suitably secured to the inner face of the forwardly facing wall preferably immediately above the windshield.

In order to prevent the entrance of foreign material such as rain or snow into the interior of the vehicle and to control the volume and direction of the air entering the header 34, an inwardly and upwardly curved baffle 50 is provided within the header 34 extending transversely thereof adjacent the inlet end of the header and immediately behind the injector openings 30. To provide a simplified mounting for the baffle 50 it is provided with a downwardly extending flange 52 along its forward edge which fits within a transverse groove in the forwardly facing wall immediately below the injector opening 30 to securely hold that edge of the baffle in place and is suitably connected to the side walls 36 and 38 of the header to provide a rugged mounting for the baffle.

Air entering the header through the injector opening is confined between the baffle 50 and the wall portion 14 and as it strikes the upwardly directed baffle any moisture or rain carried by the injected air is removed therefrom and drains downwardly to the forward edge of the baffle 50 where it may be discharged from the interior of the vehicle through suitable openings 54 in the forwardly facing front wall adjacent the bottom edge of the baffle which communicate with the space forwardly of the baffle.

To control the volume of air entering the header a pivoted damper 56 is pivotally mounted by means of a hinge 58 to the inner face of the roof portion 14, the damper extending transversely of the header for cooperation with the upper edge of the baffle 50. The damper 56 is provided with a downwardly extending arm 58 which is pivotally connected to the inner edge of the damper substantially at its center and projects downwardly into the interior of the vehicle body through a suitable opening provided in the bottom wall 35 of the header. In order to provide an air tight connection between the interior of the header and the passenger compartment through the opening for the arm 58, resilient members preferably made of sponge rubber material are preferably provided around the arm 58 and over the opening on both sides of the bottom wall 35 so that the arm 58 may be slidably moved through the opening but air may not enter the interior of the vehicle through the opening. By moving the arm 58 up or down the damper 56 is moved to an open or closed position so as to regulate the volume of air entering the header through the injector opening.

In order to control and regulate the direction of the air discharged into the passenger compartment from the header an aero fin member 60 is adjustably mounted within the outlet opening 44 on the header 35. The aero fin member 60 comprises a frame structure having sides 62 and 64 between which extend transversely extending baffles or fins, 66. The transversely extending baffles 66 are preferably in the form of flat strips and are preferably fixed relative to the sides 62 and 64 so that the upper baffle members are substantially horizontal while the lower baffle members 66 are angled with respect to the upper baffle members as shown at 68, so that the air entering the passenger compartment adjacent the lower portion of the aero fin member is directed downwardly while the air adjacent the upper portion of the aero fin member is directed substantially horizontally into the passenger compartment. This relationship between the baffle members insures proper diffusion and distribution of the entering air.

To further control the diffusion and direction of the entering air the member 60 is pivotally mounted by means of hinges 70 at the lower ends of the sides 62 and 64 which are secured to the sides 36 and 38 adjacent the bottom thereof. Elongated curved slots 72 are provided in the sides 36 and 38 adjacent the top of the member 60; and the member 60 is provided with projections 74 which extend through and are guided by the slots 72. One of the projections at one side of the member 60 is preferably provided with a threaded end 76 which projects through the slot 72 and is provided with a threaded member 78 which screws on to the end of the projection 76 to adjustably secure the member 60 at the desired location relative to the slot 72. As the baffle members 66 provide air discharge passages therebetween it can be seen that by suitably adjusting the position of the projections 74 within the slots 72, the direction of discharge of the air entering the passenger compartment may be suitably controlled. The direction of the air entering the vehicle is indicated by the arrows 80 in Figs. 1 and 2 and as indicated in these figures the direction of air entering the vehicle may be varied by adjusting the position of the member 60.

In order to have more flexible ventilating operation for the assembly, a fan 82 having a motor M and fan blades 84 is preferably mounted within the header 34 immediately behind the aero fin member 60 to assist in directing the incoming air therethrough. The main purpose of the fan is to insure the adequate supply of fresh air to the interior of the vehicle body, particularly when the vehicle is at rest, and to insure an adequate circulation of the air within the passenger compartment.

To provide for various ventilating operations to be described in further detail hereinafter the variable speed motor M is connected in the manner illustrated in the wiring diagram shown in Fig. 4. Current for the motor M is preferably provided from the battery 81 which is grounded at one side 83 and connected at the other side through lead wire 84 to the contact arm 85 of a single-pole double-throw switch having contact points 86 and 87. The contact point 86 is directly connected to the motor through a lead wire 88 and the opposite end of the motor is grounded as indicated at 89, completing the circuit. The contact point 87 is connected to the lead wire 88 through a suitable resistance 90. It is to be understood that the resistance 90 may either be a fixed resistance to get a predetermined desired motor speed, or it may be a variable resistance element so that any speed desired may be obtained.

It is evident from the above description that the structure of the present invention provides a ventilating assembly capable of insuring adequate and proper ventilation within the vehicle under different weather conditions. For example, during cold weather operations the damper 56 may be partially open or under certain conditions may be completely closed so that too great a volume of cold outside air is not injected into the interior of the vehicle; and the fan 82 may be operated at a comparatively low speed through the contact 87 and resistance 90 which under those conditions would insure proper ventilation and circulation in the passenger compartment. For warm weather operations the damper 56 may be completely opened so that a great volume of outside fresh air is supplied to the interior of the vehicle, and under such conditions the fan may be operated at a higher rate of speed through the direct contact 86 so that an adequate supply of circulating fresh air is provided within the passenger compartment, particularly when the vehicle is at rest. As the switch 85 is mounted in a position conveniently accessible to the vehicle operator and with the relatively easy adjustment of the damper 56 and the aero fin member 60, it can be seen that the assembly may be conveniently and quickly adjusted by the operator to insure proper ventilation within the passenger compartment.

Formal changes may be made in the specific embodiments of the invention described without departing from the spirit and substance of the broad invention, the scope of which is commensurate with the appended claim.

What I claim is:

A vehicle body and ventilator comprising a roof structure and a forwardly facing wall adjacent thereto, an air injector opening in the upper portion of said forwardly facing wall, a header mounted within said vehicle body over said injector opening having a substantially horizontally directed air discharge opening communicating with the interior of the vehicle remote from said injector opening, an adjustable baffle means pivotally mounted about a horizontal axis at the lower edge thereof associated with the header opening remote from the injector opening, said baffle means including transversely extending fins providing air directing passages therebetween, certain of said transversely extending fins being angularly disposed relative to others of the fins, means for adjusting said baffle means whereby the air entering the body may be selectively directed, an upwardly and inwardly extending deflector within said header adjacent said injector opening to direct the passage of air into said header, and adjustable damper associated with said deflector, means to adjust said damper to control the passage of air into said header, a fan within said header between said baffle means and said damper, and means to control the operation of said fan.

ALFRED R. LINTERN.